Figure 1:
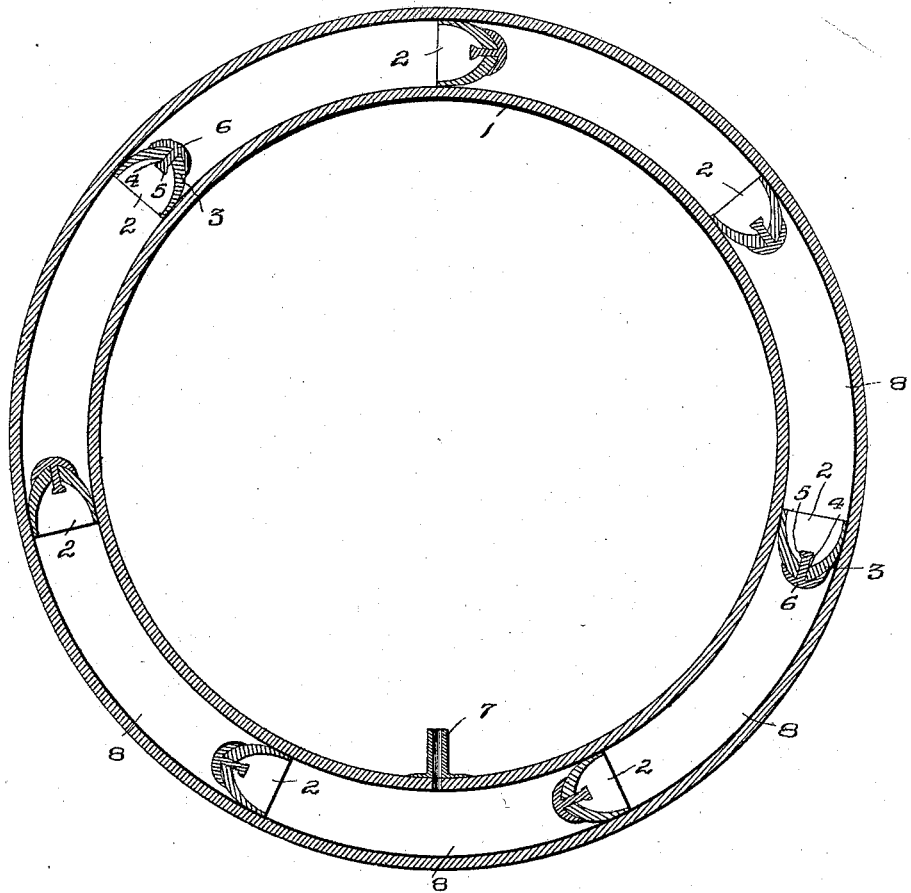

(No Model.)

G. A. LINDSTROM.
PNEUMATIC TIRE.

No. 590,992. Patented Oct. 5, 1897.

Witnesses
Jas. L. Bowen
Victor J. Evans

Inventor
Gus. A. Lindstrom,
By John Wedderburn.
Attorney

UNITED STATES PATENT OFFICE.

GUSTAF A. LINDSTROM, OF JERSEY CITY, NEW JERSEY.

PNEUMATIC TIRE.

SPECIFICATION forming part of Letters Patent No. 590,992, dated October 5, 1897.

Application filed April 28, 1897. Serial No. 634,292. (No model.)

*To all whom it may concern:*

Be it known that I, GUSTAF A. LINDSTROM, a subject of the King of Sweden and Norway, residing at Jersey City, in the county of Wood and State of New Jersey, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires; and the object of the invention is to provide, in connection with a single-tube pneumatic tire, means whereby the air in that portion of the tire which is in contact with the ground will be forced toward the front of the wheel, thereby advancing the whole body of air in the tire until it compresses just in rear of the point of impact of the tire with the ground. The reason for this is that the compressed air at the point named hardens the tire just in the rear of the point of impact, this rendering the tire easy running and obviating drag in the tire.

To this end the invention consists in an improved pneumatic tire embodying certain novel features and details of construction hereinafter fully described and illustrated in the drawings, and incorporated in the claims.

Figure 2:
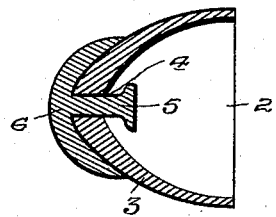

In the accompanying drawings, Figure 1 is a longitudinal section through a complete tire constructed in accordance with this invention. Fig. 2 is an enlarged detail longitudinal section showing the form of one of the cones and valves.

Similar numerals of reference designate corresponding parts in both views.

The improved pneumatic tire contemplated in this invention comprises an ordinary resilient tube of rubber or combined canvas and rubber. For the purpose of carrying out the present invention a plurality of resilient cones 2, of rubber, are placed within the tire and arranged at approximately equal intervals therein. The largest diameter of each cone corresponds to the inner diameter of the tire 1, and while such cone is thin at its outer edges where it is united to the inner surface of the tire the central portion of the cone is thickened to form a valve-seat 3. The cone 2 is hollow and is provided at a central point with an opening, preferably of rectangular shape. Extending through and working within the opening 4 is the stem 5 of a check-valve 6, the body of the valve being substantially concavo-convex to fit snugly and closely around the valve, so as to prevent the air from passing through the valve in one direction while freely admitting the air through the valve in the opposite direction. The stem 5 of the valve may be enlarged at its extremity or any suitable means may be employed for preventing the entire displacement of the valve from its seat.

The tire is primarily inflated through an ordinary valve 7, connected to the tire at a suitable point, until the tire is sufficiently hard for riding purposes. In riding the machine or in the rotation of the wheel to which the tire is applied the tire will be compressed at the point of impact, as indicated at 8, this causing a displacement of the air from the compartment contained between two of the valves. As the air cannot pass rearward it must pass forward, and in entering the next compartment the air therein is compressed to a greater extent, thus forcing the air in the third compartment, and so on until the air is forced in the original compartment at the point just in the rear to the point of impact. This effects a hardening of the tire just in rear of the point of impact and prevents what is known as a "back drag," thereby increasing the easy-running qualities of the tire in a manner that will be readily understood by those familiar with the art to which this invention appertains.

It will of course be understood that the valves and seat are susceptible of changes in the form, proportion, and minor details of construction, which may accordingly be resorted to without departing from the principle or sacrificing any of the advantages of the invention.

Having thus described the invention, what is claimed as new, and desired to be secured by Letters Patent, is—

1. The combination with a pneumatic tire, of resilient cones arranged at intervals therein and united to the inner surface of the tire, and check-valves located adjacent to said cones.

2. The combination with a pneumatic tire, of resilient cones united to the inner surface of the tire at intervals, each of said cones comprising thin outer edges and a thickened central portion having an opening therein, and a corresponding series of check-valves having their stems arranged in the openings in the cones, substantially as described.

In testimony whereof I have signed this specification in the presence of two subscribing witnesses.

GUSTAF A. LINDSTROM.

Witnesses:
CHARLES HARTILL,
JAMES WARD.